United States Patent

Illers et al.

[11] 4,098,773
[45] Jul. 4, 1978

[54] PROCESS FOR PREPARING HEAT-RESISTANT POLYURETHANE ELASTOMERS HAVING NO SECONDARY SOFTENING RANGE

[75] Inventors: Karl Heinz Illers, Otterstadt; Herbert Stutz, Karlsruhe, both of Germany

[73] Assignee: BASF Wyandotte Corporation, Wyandotte, Mich.

[21] Appl. No.: 730,945

[22] Filed: Oct. 8, 1976

[30] Foreign Application Priority Data

Oct. 25, 1975 [DE] Fed. Rep. of Germany ....... 2547866

[51] Int. Cl.$^2$ ...................... C08G 18/10; C08G 18/76
[52] U.S. Cl. ...................................... 528/65; 521/159
[58] Field of Search ....... 260/75 NK, 75 NP, 75 NE, 260/77.5 AA, 77.5 AM

[56] References Cited

U.S. PATENT DOCUMENTS

| | | | |
|---|---|---|---|
| 2,729,618 | 1/1956 | Mueller et al. | 260/75 NP |
| 2,871,218 | 1/1959 | Schollenberger | 260/77.5 AP |
| 3,070,427 | 12/1962 | Harris et al. | 260/75 NE |
| 3,457,234 | 7/1969 | Gianatasio | 260/77.5 AM |
| 3,963,656 | 6/1976 | Meisert et al. | 260/75 NE |

OTHER PUBLICATIONS

Smith–Rubber World, vol. 139, pp. 533–541 and 699–701 (1959).
Saunders et al., Polyurethanes, Part I, pp. 269–272, 278–283; Part II, pp. 400 and 411–416, Interscience, N.Y. 1962 and 1964.
Schneider et al. Macromolecules, Feb. 1975, pp. 62–67.

*Primary Examiner*—H.S. Cockeram
*Attorney, Agent, or Firm*—John W. Linkhauer; Bernhard R. Swick; Robert E. Dunn

[57] ABSTRACT

The invention concerns a process for making heat-resistant polyurethane elastomers from substantially linear polyhydroxyl compounds of high molecular weight, polyisocyanates, chain extenders, and, if desired, catalysts and additives, in which the polyhydroxyl compound is reacted with diisocyanate material in amounts to give an OH:NCO ratio of 1:1.10 to 1:2 and produce an adduct, and the adduct is subsequently reacted with symmetrical aromatic diisocyanate and a diol as chain extender (preferably a linear diol containing 2,4 or 6 carbon atoms) to obtain a crystalline or crystallizable diurethane or polyurethane of good heat resistance.

3 Claims, 1 Drawing Figure

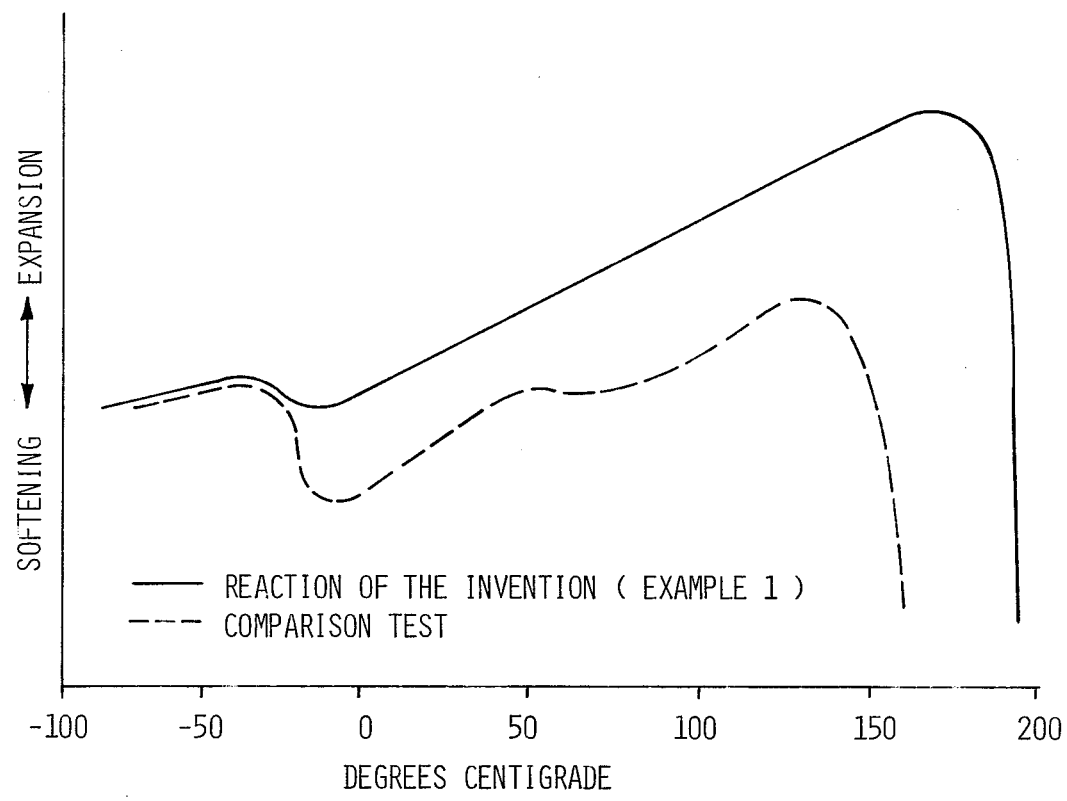

PROCESS FOR PREPARING HEAT-RESISTANT POLYURETHANE ELASTOMERS HAVING NO SECONDARY SOFTENING RANGE

BACKGROUND OF THE INVENTION

1. Field of the Invention

This invention relates to a process for the production of heat-resistant polyurethane compositions.

2. Description of the Prior Art

The invention concerns a process for the production of heat-resistant polyurethane elastomers from generally known starting components, in which an isocyanate-terminated adduct, produced from a principally linear polyol and a diisocyanate with relatively unreactive NCO groups or with isocyanate groups of different reactivity, is reacted with an aromatic diisocyanate of symmetrical structure and a chain extender.

Polyurethane elastomers based on high-molecular-weight polyols, diisocyanates and low-molecular-weight chain extenders are characterized by a balanced set of properties according to the state of the art and have therefore proved themselves to be highly useful in a number of applications.

Despite the advantages in mechanical properties and wear resistance, the polyurethane elastomers of the state of the art still have serious disadvantages which considerably limit their applications. These consist primarily of their inadequate heat stability, leading to early softening and thus to failure of parts subjected to high stress. This insufficient heat stability of the known materials has the result that parts under a dynamic stress, e.g., highly stressed runners, rolls or tires, already begin to soften at 50°–80° C, thus impairing and destroying their good properties This material characteristic thus far has considerably limited the introduction of polyurethane elastomers in fields in which the material is subjected to high dynamic as well as thermal loads.

Thus far, polyurethane elastomers with improved heat stability could be produced only with the use of very costly and less common starting materials, such as naphthalene-1,5-diisocyanate, or toxic materials, such as methylene-bis(2-chloroaniline).

For these reasons, considerable industrial interest exists in the development of polyurethane elastomers which no longer have these shortcomings and therefore have a broader field of application.

SUMMARY OF THE INVENTION

The invention concerns a process for making heat-resistant polyurethane elastomers from substantially linear polyhydroxyl compounds of high molecular weight, polyisocyanates, chain extenders, and, if desired, catalysts and additives, in which the polyhydroxyl compound is reacted with diisocyanate material in amounts to give an OH:NCO ratio of 1:1.10 to 1:2 and produce an adduct, and the adduct is subsequently reacted with symmetrical aromatic diisocyanate and a diol as chain extender (preferably a linear diol containing 2,4 or 6 carbon atoms) to obtain crystalline or crystallizable diurethane or polyurethane of good heat resistance.

DESCRIPTION OF DRAWING

A complete understanding of the invention may be obtained from the following and foregoing description thereof taken in conjunction with the appended drawing, the sole figure of which is a graph displaying the heat-stability properties of a polyurethane polymer made in accordance with the invention, in comparison with the properties of a similar polyurethane polymer not so made.

DESCRIPTION OF THE PREFERRED EMBODIMENTS

An object of the invention is to produce polyurethane elastomers of high heat stability and with good mechanical properties from economical and industrially readily available starting materials.

It was found unexpectedly that heat-resistant polyurethane elastomers can be manufactured from primarily linear high-molecular-weight polyols, polyisocyanates, chain extenders and, if desired, catalysts and additives, if the primarily linear, high-molecular-weight polyhydroxyl compound is reacted with an aliphatic, cycloaliphatic, aliphatic-aromatic, or sterically hindered aromatic diisocyanate, or 4,4'-diphenylmethane diisocyanate, in such a quantity that the ratio of OH:NCO groups is 1:1.10 to 1:2 and by subsequently converting the adduct containing terminal isocyanate groups with an aromatic diisocyanate of symmetrical stucture and a diol as a chain extender, provided that the number of isocyanate groups to the total number of all hydrogen atoms capable of reacting with isocyanate amounts to about 1.2:1 to 0.9:1.

The polyurethane elastomers obtained by the process of the invention have the advantage that they not only have the known high mechanical strength values but also have softening temperatures or ranges above 150° C, preferably between 150° and 200° C (measured by thermomechanical analysis with the TMA attachment for the DuPont Thermal Analyzer 990).

All polyols, polyisocyanates and low-molecular-weight chain extenders known in the art are suited for manufacture of the polyurethane elastomers by the process of the invention. However, it is important and must be kept in mind that only symmetrical aromatic diisocyanates, which form crystalline or crystallizable di- and/or polyurethanes with the added chain extender, can be considered for the conversion with the adduct containing terminal isocyanate groups, while the adducts containing the isocyanate groups themselves can be produced from primarily linear high-molecular-weight polyols and aliphatic, cycloaliphatic, aliphatic-aromatic, or sterically hindered aromatic diisocyanates, or 4,4'-diisocyanate diphenylmethane. In addition to symmetrical 4,4'-diisocyanate diphenylmethane, particularly those diisocyanates are used to produce the isocyanate-group-containing adducts which are relatively unreactive compared to aromatic diisocyanates or have isocyanate groups of different reactivity.

Examples of polyhydroxyl compounds to be cited are hydroxyl-group-containing polyesters, polyester amides, polyethers and/or polyacetal with molecular weights of 800–20,000, preferably 1,000–5,000. Preference is given to hydroxyl-group-containing linear polyesters and polyethers. The polyhydroxyl compounds must have at least a predominantly linear structure, i.e., be bifunctional in the context of the isocyanate reaction. The cited polyhydroxyl compounds can be used as individual components or in the form of mixtures.

Suitable hydroxyl-group-containing polyesters or polyester amides may be produced, for example, from dicarboxylic acids with 2–12 carbon atoms and polyvalent alcohols, possibly with the addition of amino alcohols or diamines. Examples of dicarboxylic acids are aliphatic dicarboxylic acids, such as succinic acid, glutaric acid, adipic acid, suberic acid, azelaic acid, and sebacic acid, and aromatic dicarboxylic acids, such as phthalic acid, isophthalic acid the terephthalic acid. The dicarboxylic acids can be used singly or as a mixture. For the production of polyester polyols it may also be an advantage to use the corresponding carboxylic acid derivatives, such as carboxylic acid esters with 1–4 carbon atoms in the alcohol moiety, carboxylic acid anhydrides, or carboxylic acid chlorides, in place of the carboxylic acids themselves. Examples of polyvalent alcohols are glycols with 2–16 carbon atoms, preferably 2–6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 2,2,4-trimethyl-1,3-pentanediol, 1,3-propanediol, 1,2-propanediol, and di- and tripropylene glycol. Depending on the desired properties, the polyvalent alcohols can be used singly or in mixtures or with small amounts of diamines or amino alcohols, such as ethylenediamine, 1,4-diaminobutane, piperazine, ethanolamine or N'-methyl-diethanolamine. Moreover, suitable materials are the esters of the carboxylic acid with the cited diols, especially those with 4–6 carbon atoms, such as 1,4-butanediol and/or 1,6-hexanediol, condensation products of ω-hydroxycarboxylic acids, such as e.g., ω-hydroxycaproic acid and preferably, polymerization products of cyclic lactones, e.g., possibly substituted ε-caprolactones. The hydroxyl group-containing polyesters or polyester amides usually have molecular weights of 1,000–5,000.

Suitable polyether polyols can be produced by converting one or several alkylene oxides with 2–4 carbon atoms in the alkylene moiety with a starter molecule containing several active hydrogen atoms in bound form. Suitable alkylene oxides are, e.g., ethylene oxide, 1,2-propylene oxide, epichlorohydrin, 1,2-butylene oxide and 2,3-butylene oxide. The alkylene oxides can be used singly, alternatingly in succession, or as mixtures. Possible starter molecules are, for example, water, amino alcohols, such as N-alkyl-diethanolamines, e.g., N-methyldiethanolamine, and diols, such as ethylene glycol, propylene glycol, 1,4-butanediol and 1,6-hexanediol. Suitable polyether polyols furthermore are the hydroxy-group-containing polymerization products of tetrahydrofuran. The hydroxyl-group-containing polyethers which also have a predominantly linear, i.e., bifunctional, structure like the above-cited polyester polyols, have molecular weight of 800–20,000, preferably 1,000–5,000. Polyacetals to be considered are principally formals, such as polybutanediolformal and polyhexanediolformal.

Suitable materials for the production of adducts containing terminal isocyanate groups, customarily referred to as isocyanate-group-containing prepolymers, are aliphatic, cycloaliphatic, aliphatic-aromatic, or sterically hindered aromatic diisocyanates, or 4,4'-diisocyanato diphenlmethane. Specifically, the following can be cited as examples: aliphatic diisocyanates, such as ethylene diisocyanate, butane diisocyanate, decane diisocyanate, 2,2,4-(2,4,4-)trimethylhexane diisocyanate and preferably 1,6-hexamethylene diisocyanate; cycloaliphatic diisocyanates, such as 1,4-, or 1,3-cyclohexane diisocyanate, 3-isocyanatomethyl-3,5,5-trimethylcyclohexylisocyanate (isophorone diisocyanate) and 4,4'-diisocyanato dicyclohexylmethane; aliphatic-aromatic diisocyanates, such as 1-(4-isocyanatophenyl)-2-isocyanatoethane and 4,4'-diisocyanato phenylcyclohexylmethane; and sterically hindered aromatic diisocyanates, such as 2,4'-diphenylmethane diisocyanate and 2,4-toluene diisocyanate. Particularly advantageous results are obtained not only with 4,4'-diisocyanato diphenylmethane but also with diisocyanates having isocyanate groups of different reactivity, such as those of the mixed aliphatic-aromatic series. Consequently, preference is given to the use of 4,4'-diisocyanato phenylcyclohexylmethane and especially 2,4-toluene diisocyanate and 4,4'-diisocyanato diphenylmethane.

As mentioned, it is important for the invention that the adducts containing terminal isocyanate groups are reacted with symmetrical aromatic diisocyanates which form crystalline or crystallizable di- and/or polyurethanes with the chain extender. Such aromatic diisocyanates must have a symmetrical structure. Proved compounds are aromatic diisocyanates, such as 1,4-phenylenediisocyanate, 1,5-naphthalenediisocyanate and, preferably, 4,4'-diisocyanato diphenylmethane, which results in polyurethane elastomers with particularly favorable mechanical properties and high heat stability.

Chain extenders to be considered are diols with 2–6 carbon atoms and especially those with an even number of carbon atoms, and esters of terephthalic acid with glycols with 2–4 carbon atoms. Examples to be cited are diethyleneglycol terephthalate and di-1,4-butanediol-terephthalate. Preference is given to ethylene glycol, 1,4-butanediol and 1,6-hexanediol, and of the latter, 1,4-butanediol has proved to be particularly suitable. To the extent to which cellular polyurethane elastomers are to be produced by the process of the invention, water can also be used as a chain extender.

For the production of the adducts containing terminal isocyanate groups, the high molecular weight polyhydroxyl compounds are reacted with the cited aliphatic, cycloaliphatic, aliphatic-aromatic, sterically hindered aromatic diisocyanates or 4,4'-diisocyanate diphenylmethane in such quantities that the OH:NCO group ratio is 1:1.10 to 1:2 and preferably 1:1.15 to 1:1.8, especially 1:1.15 to 1:1.3.

The adducts having terminal isocyanate groups obtained are reacted with the symmetrical aromatic diisocyanate and the chain extender. In order to obtain polyurethane elastomers with the excellent qualities, it is important for the weight ratio of adduct with terminal isocyanate groups to the sum of symmetrical aromatic diisocyanate and diol chain extender to be 65:35 to 95:5, preferably 65:35 to 90:10, and for the ratio of the number of isocyanate groups to the total number of all hydrogen atoms capable of reacting with isocyanate to amount to about 0.9:1 to 1.2:1. If the ratio of the number of isocyanate groups to the total number of all hydrogen atoms capable of reacting with isocyanate ranges between 1.0 and 1.2, the range between 1.0 and 1.1 being particularly preferred, then at least partially cross-linked polyurethane elastomers are obtained. On the other hand, if an NCO:OH ratio of less than 1, about 0.9 to 1.0, is selected, thermoplastic, deformable polyurethane elastomers are obtained.

For the production of the polyurethane elastomers of the invention, the starting materials are reacted at temperatures of 80°–220° C, preferably 100°–150° C. Specifically, production takes place as follows. The high-molecular-weight polyhydroxyl compound is dehydrated as usual by stirring at higher temperatures and at reduced pressure, and is reacted with the established quantity of an aliphatic, cycloaliphatic, aliphatic-aromatic, or sterically hindered aromatic diisocyanate, or 4,4'-diisocyanato diphenylmethane, to form an adduct with terminal isocyanate groups. In this reaction step, the quantity of diisocyanate is suitably metered in such a way that the adduct melt after the reaction does not contain significant amounts of free diisocyanate. After completion of the reaction, the isocyanate-group-containing adduct is diluted with the symmetrical aromatic diisocyanate—generally this involves the main quantity—and the chain extender is stirred into the melt. After displacement of dissolved gases, the polyurethane melt is cast into molds and hardened. Hardening of the moldings to the end product takes place by curing at temperatures of 100°–200° C, preferably 100°–150° C.

Naturally, all known and customary aids and additives can be added to the reaction mixture, such as catalysts, retardants, colorants, pigments, organic or inorganic fillers, and oxidation and hydrolysis stabilizers.

The polyurethanes produced according to the invention are especially characterized by their excellent heat stability and are therefore particularly suited for such products which are exposed to high thermal stresses, such as dynamically stressed runners, vehicle tires, dust hoods on motors and transmissions, seals, and the like. The product can be used in compact as well as cellular form.

The parts listed in the examples refer to weight.

EXAMPLE 1

A commercial polyester of adipic acid and ethylene glycol with an OH number of 54 (311.7 parts) in a stirred flask equipped with thermometer and vacuum connection is dehydrated at 100° C and 15 mm. Hg for 1 h. Fifty parts of 4,4'-diisocyanato diphenylmethane are stirred into the melt of this polyester and are reacted at 80° C for 30 minutes. Subsequently, 43.75 parts of 4,4'-diphenylmethanediisocyanate are added with stirring, and dissolved gases are displaced from the melt of this prepolymer by evacuation. Subsequently, 18.66 parts 1,4-butanediol and 0.05 part acetylacetone are added; the mixture is homogenized and degassed briefly once more. The bubble-free castable melt is then poured into molds and postcured at 120° C for 24 h.

The softening properties of this elastomer were tested by thermomechanical analysis with the TMA attachment for the DuPont Thermal Analyzer 990. A specimen of certain weight was loaded and continuously heated. Softening of the specimen was measured by the penetration of a penetrator. A penetrator of 2.54 mm. diameter served as the probe. The load on the penetrator amounted to 100 g, and the heating rate was 5° C/minute. The specimen thickness was 5 mm.

The test revealed a linear expansion of the specimen between the glass transition temperature of the soft phase and melting of the crystalline solid phase. The start of softening of this specimen, which indicates the start of melting of the solid phase, lay at about 180° C. Softening processes at lower temperatures do not occur here (see FIGURE).

COMPARISON EXAMPLE

If the same procedures as in Example 1 are used, but the total quantity of 4,4'-diphenylmethanediisocyanate is added to the hydroxyl group-containing polyester in one portion, a polyurethane elastomer is obtained in which a thermomechanical test reveals a softening range between 50 and 80° C and a final start of softening at 140° C (see the FIGURE).

Thus, the process of the invention led to a polyurethane elastomer consisting of the same starting components but having a heat stability improved by more than 100° C.

EXAMPLE 2

If the analogous procedure as in Example 1 is used, but 32.5 parts 4,4'-diphenylmethanediisocyanate and 14.80 parts 1,4-butanediol are employed in the second diisocyanate addition following the use of 311.7 parts hydroxyl group-containing polyester and 50.0 parts 4,4'-diphenylmethanediisocyanate, then a polyurethane elastomer having a hardness of 77 Shore A is obtained. Thermomechanical testing of the material gave a start of softening at 185° C, without showing softening ranges at lower temperatures.

EXAMPLE 3

In a manner analogous to the data of Example 1, 311.7 parts of a polyester containing hydroxyl groups and consisting of adipic acid and ethylene glycol with a hydroxyl number of 54 are reacted to form a prepolymer containing isocyanate groups with the use of 50 parts 4,4'-diphenylmethanediisocyanate, and then to form a polyurethane elastomer with 73.25 parts of 4,4'-diphenylmethanediisocyanate and 28.96 parts 1,4-butanediol. The product had a hardness of 88 Shore A. Thermomechanical tests revealed only one softening range, starting at 180° C. No softening processes were observed at lower temperatures.

COMPARISON EXAMPLE

If the analogous procedure as in Example 3 is used, but the total amount of 4,4'-diisocyanatediphenylmethane is added in one portion to the hydroxyl group-containing polyester, a polyurethane elastomer is obtained having a hardness of 86 Shore A and exhibiting a first softening range between 70° and 90° C and a start of final softening at 170° C in the thermomechanical test.

EXAMPLE 4

The analogous procedure as in Example 1 is used, but in addition to the 311.7 parts hydroxyl group-containing polyester and 75 parts 4,4'-diphenylmethanediisocyanate, there are employed during the second diisocyanate addition 48.75 parts 4,4'-diphenylmethanediisocyanate and 28.96 parts 1,4-butanediol.

A polyurethane elastomer with a start of softening at 170° C is obtained. No softening processes were observed at lower temperatures.

EXAMPLE 5

In a stirred flask with thermometer and vacuum connection, 311.7 parts of a polyester of ethylene glycol and adipic acid with an OH number of 54 were dehydrated at 100° C and 15 mm. Hg for 1 h. Then 40.3 parts hexamethylenediisocyanate were added and stirred for 1 h at 100° C. Then 63.75 parts 4,4'-diphenylmethanediisocyanate were stirred into the melt of this prepolymer, and air bubbles were removed from the reaction mixture by evacuation. Subsequently, 28.96 parts butanediol were added at 80°, the mixture was homogenized, and the castable melt was poured into molds and post-cured for 1 week at 100° C.

The product had the following characteristics:

| | |
|---|---|
| Tear strength (DIN 53504) | 457 kiloponds per square centimeter |
| Elongation at break | 688% |
| Propagation tear strength (DIN 53515) | 72 kiloponds per centimeter |

(One kilopond is the force exerted by earth's gravity on a mass of one kilogram).

Differential thermal analysis of the material revealed a glass transition temperature of −36° C.

The test revealed a linear expansion of the specimen from the glass transition temperature, through the soft phase, and to the melting of the crystalline solid phase, which starts at 170°–175° C. No other softening processes exist at lower temperatures.

EXAMPLE 6

Of the polyester described in Example 5, 311.7 parts were dehydrated and reacted with 47.0 parts toluene diisocyanate (2,4-/2,6-TDI isomer ratio = 80/20) at 90° C for 30 minutes. Subsequently, in analogy to the data of Example 5, 56.4 parts 4,4'-diphenylmethanediisocyanate, 29.0 parts butanediol and 0.1 parts acetylacetone were added, and the melt was cast into molds and cured at 120° C for 24 hours.

The resulting elastomer had the following characteristics:

| | |
|---|---|
| Shore hardness A | 68 |
| Tear strength (DIN 53504) | 465 kiloponds per square centimeter |
| Elongation at break | 580% |
| Propagation tear strength (DIN 53515) | 23 kiloponds per centimeter |

A thermomechanical test of the material revealed a linear expansion of the specimen between the glass-transition temperature of the soft phase and melting of the crystalline solid phase. The start of softening of the specimen is about 170° C.

EXAMPLE 7

If a procedure analogous to that in Example 6 is used, but 49.65 parts 2,4-toluenediisocyanate and 52.6 parts 4,4'-diphenylmethanediisocyanate are used, a polyurethane with the following characteristics is obtained:

| | |
|---|---|
| Shore hardness A | 62 |
| Tear Strength (DIN 53504) | 408 kiloponds per square centimeter |
| Elongation at break | 605% |
| Propagation tear strength (DIN 53515) | 20 kiloponds per centimeter |

A thermomechanical test of the softening properties showed a linear expansion of the specimen between the glasstransition temperature of the soft phase and melting of the crystalline solid phase, in the absence of other intermediate softening processes. The start of softening of the specimen is at about 160° C.

EXAMPLE 8

The test of Example 6 was repeated with the use of 300 parts of a commercial polytetrahydrofuran with an OH number of 56 ("Polymeg 2000" of Quaker Oats Co.), 36.6 parts toluenediisocyanate with an isomer ratio of 2,4-/2,6 of 80:20, 74.2 parts 4,4'-diphenylmethanediisocyanate, and 30.0 parts 1,4-butanediol.

The material had a Shore A hardness of 73.

Thermomechanical testing of the softening properties shows that the start of softening by melting of the crystalline solid phase occurs at 160° C. No other melting or softening processes exist, except for the glass-transition temperature of the soft phase.

EXAMPLE 9

The test of Example 6 was repeated, with the use of 350 parts of a polycaprolactone with an OH number of 26, 21.6 parts toluenediisocyanate with a 2,4-/2,6-isomer ratio of 80:20, 86.9 parts 4,4'-diphenylmethanediisocyanate, and 33.0 parts butanediol.

The softening test showed the start of softening of the specimen at 170° C. No other softening processes are present at lower temperatures.

The embodiments of the invention in which an exclusive property or privilege is claimed are defined as follows:

1. A process for the production of polyurethane elastomers with a start of softening temperature of about 160° C. or higher from substantially linear high-molecular-weight polyhydroxy compounds, polyisocyanates, and chain-extenders, wherein a substantially linear polyhydroxy compound of molecular weight of 800 to 20,000 is reacted with such a quantity of 4,4'-diphenylmethanediisocyanate that the ratio of OH:NCO groups amounts to 1:1.10 to 2, and the adduct obtained, containing terminal isocyanate groups, is subsequently mixed with 4,4'-diphenylmethanediisocyanate and the mixture is reacted with a diol containing 2 to 6 carbon atoms as a chain extender, provided that the ratio of the number of isocyanate groups to the total number of all hydrogen atoms capable of reacting the isocyanate groups amounts to 1.2 to 0.9:1, and the weight ratio of said adduct containing terminal isocyanate groups to the sum of 4,4'-diphenylmethanediisocyanate and said diol amounts to 65:35 to 95:5, the starting materials being reacted at a temperature of 80 to 220° C.

2. A process according to claim 1, wherein a linear diol with an even number of carbon atoms between 2 and 6 is used as chain extender to form with said 4,4'-diphenylmethanediisocyanate a product selected from the group consisting of the crystalline and crystallizable polyurethanes.

3. A process according to claim 1 wherein a material selected from the group consisting of ethylene glycol, 1,4-butanediol, and 1,6-hexanediol is used as said chain extender.

* * * * *